March 30, 1943.   E. WILDHABER   2,315,147
CUTTER FOR AND METHOD OF CUTTING GEARS
Filed Sept. 17, 1937   5 Sheets-Sheet 1

Inventor
Ernest Wildhaber
By
Attorney

March 30, 1943.   E. WILDHABER   2,315,147
CUTTER FOR AND METHOD OF CUTTING GEARS
Filed Sept. 17, 1937   5 Sheets-Sheet 3

Inventor
Ernest Wildhaber
By
B. Schlesinger
Attorney

March 30, 1943.  E. WILDHABER  2,315,147
CUTTER FOR AND METHOD OF CUTTING GEARS
Filed Sept. 17, 1937   5 Sheets-Sheet 4

Inventor
Ernest Wildhaber
By
Attorney

March 30, 1943.   E. WILDHABER   2,315,147
CUTTER FOR AND METHOD OF CUTTING GEARS
Filed Sept. 17, 1937   5 Sheets-Sheet 5

Ernest Wildhaber
INVENTOR
BY
ATTORNEY

Patented Mar. 30, 1943

2,315,147

UNITED STATES PATENT OFFICE 2,315,147

CUTTER FOR AND METHOD OF CUTTING GEARS

Ernest Wildhaber, Irondequoit, N. Y., assignor to Gleason Works, Rochester, N. Y., a corporation of New York Application September 17, 1937, Serial No. 164,340

53 Claims. (Cl. 90—9)

The present invention relates to gears and to their manufacture and particularly to bevel gears and to tools for and methods of manufacturing such gears. The invention comprises a new and improved form of bevel gearing, a novel method of manufacture of gears and particularly bevel gears, new and improved forms of cutters for carrying out this method, and new and improved methods of relieving gear cutters and particularly gear cutters such as may be employed in the manufacture of the new gearing.

The primary object of this invention is to provide an extremely fast method for cutting gears. To this end, it is a further object of the invention to provide a method for cutting gears in which a gear may be roughed and finished in a single set-up and with a single tool. To this end, also, it is an object of the invention to provide a rotary tool of disc-form for cutting gears, which has a sufficient number of cutting blades arranged around its periphery to permit roughing and finishing a tooth space of a gear on each revolution of the cutter and which has a gap between the last finishing blade and the first roughing blade of sufficient angular extent to permit the blank to be indexed when the gap in the cutter is abreast of the blank without withdrawal of the cutter from the blank. In a still further aspect, it is an object of the invention to provide a cutter of the type described which is capable of cutting two sides of a tooth space simultaneously.

A further object of the invention is to provide a form of gearing and a method and tool for cutting the same whereby both members of a pair of gears may be cut without generating roll. This not only makes for fast production but permits of use of a very simple and rigid gear cutting machine.

A still further object of the invention is to provide a new form of rotary disc cutter and method of using same which will permit of cutting with such a tool teeth of varying thickness and varying tooth profile shapes from one end to the other on a bevel gear.

Another object of the invention is to provide a simple and efficient method for relieving the blades of cutters such as may be employed in practicing this invention.

Other objects of the invention will be apparent hereinafter from the specification and from the recital of the appended claims.

With the present invention, a rotary cutter of disc form is employed that has a plurality of radially disposed cutting blades arranged preferably part-way around its periphery with a gap between the last and first blades and a gear is cut by imparting a reciprocatory feed movement between the cutter and blank in the direction of the length of the gear teeth while the cutter is rotated in engagement with the blank. The blank is held stationary during cutting and is indexed when the gap in the cutter is abreast of the blank. Thus a tooth surface or a pair of tooth surfaces may be cut for their full length on each revolution of the cutter.

The blades of the cutter are shaped to produce the required tooth shape of the tooth surfaces being cut. For a bevel gear, the shape varies on different blades corresponding to the variation in profile curvature of the tooth surfaces of a bevel gear from one end to the other. The sides of a tooth space may be finish-cut separately or simultaneously. Where they are cut separately, the cutter has its finishing blades preferably arranged in two groups, one group comprising the blades for cutting one side of the tooth space and the other group comprising the blades for finishing the other side of the space. A gap may be provided between the two groups of blades so that the blank may be set over relative to the cutter between the action of the two sets of blades in order that each group of blades may operate upon the proper side of the space and a space of the required width may be cut.

When two sides of a tooth space are cut simultaneously, each blade of the cutter is preferably sharpened to provide two side cutting edges. The opposite side cutting edges of the blades are then shaped to produce the required shapes on the opposite sides of the tooth slots of the work. For a bevel gear, the variation in tooth thickness and height is obtained by variation in shape of the cutting blades.

Preferably the blades are made of circular profile curvature and the variation in profile curvature from end to end of a bevel gear tooth is, then, obtained by varying the radii of curvature of successive blades of the cutter.

Where the single side method of cutting is employed, the teeth of both gear and pinion are preferably cut, as described above, by rotation of the cutter and relative reciprocation of the cutter back and forth along the length of the teeth of the blank. Where two sides of the tooth space are cut simultaneously, both the gear and pinion may be cut, also, by feeding the cutter relatively along the length of the teeth of the blank while rotating the cutter in engagement with the blank. A still faster cutting operation is possible, however, where both members of the pair are cut two tooth sides simultaneously. The gear or larger member of the pair may be cut by simply rotating a cutter whose blades have a constant profile curvature, in engagement with the blank while maintaining the axis of the cutter in fixed position relative to the length of the gear teeth. In this way, tooth slots will be cut in the gear which have concave bottoms. The tooth slots of the mating pinion are then cut by swinging the cutter in a circular arc instead of reciprocating it rectilinearly. Thus tooth slots may be cut in the pinion having convex bottoms to match the concave bottomed tooth slots cut on the gear. Where bevel pairs are being cut, the blades of the pinion cutter will have side cutting edges of varying profile curvature.

Preferably, as already stated, the cutter employed in any of the various modifications of the invention is provided with both roughing and finishing blades so that a tooth slot of the gear blank may be both rough and finish-cut from the solid in a single revolution of the cutter. The roughing operation may be effected while the axis of cutter rotation is fixed relative to the blank and the relative feed movement along the length of the teeth of the work may be employed only during finishing of the sides of the slot, or preferably the cutter is fed longitudinally of the blank during both roughing and finishing.

Ordinarily, the relative feed of a cutter longitudinally of a gear tooth will be in the direction of the root line of the blank and the finishing blades will be of uniform height. Feed may be in a direction inclined to the root line, however. When the feed movement is not along the root surface of the blank but inclined to it, the finishing blades of the cutter are made of varying height, that is, their top cutting edges may be arranged on a spiral so as to cut the root surface to the desired depth along its length.

Localized tooth bearing between the members of a pair of gears can be obtained by providing the two tools, which cut gear and pinion, with cutting edges which will produce cone elements on gear and pinion that do not pass through the cone apexes and are inclined to one another in accordance with the principles set forth generally in my prior Patent No. 1,733,326 of October 29, 1929. Where one member of the pair is cut with the cutter rotating about a relatively fixed axis, localization of bearing may be secured by suitable location of the center of swing of the cutter in the cutting of the other member of the pair.

For relieving the blades of a cutter constructed according to this invention, various methods may be employed. Two such methods are illustrated in the accompanying drawings. In one embodiment, the tops and the sides of the blades are ground in three separate dummy heads. The tops are ground by positioning the blades non-radially in a dummy head so that the tops lie in a cylinder coaxial with the dummy head and rotating the dummy head in engagement with a rotating grinding wheel. Each side is ground by positioning the blades in a dummy head so that they are offset laterally and axially from one another and positioning the head in engagement with a conical grinding wheel whose axis lies at right angles to a plane containing the axis of the dummy head, and rotating the head and wheel on their respective axes while producing a relative feed movement between the head and wheel axially of the wheel. In the other embodiment, the tops and both sides of the blades of a cutter may be ground in a single dummy head. The blades are arranged non-radially in the dummy head and the tops are ground as in the first method. Each side is ground with a conical wheel which is positioned so that its axis is inclined to the direction of relative feed between the wheel and head which direction remains, as before, perpendicular to a plane containing the axis of the head. Grinding of the sides of the blades is then effected by rotating the wheel and head on their respective axes and effecting a relative feed movement between the wheel and head in the described direction perpendicular to a plane containing the axis of the head.

Several different embodiments of the invention are illustrated in the accompanying drawings, in which.

Reference will now be had to the drawings for a more detailed description of the invention. As stated above, a gear may be cut according to this invention either one tooth-side at a time or two sides simultaneously. I shall first describe the single-side method.

Figure 8:
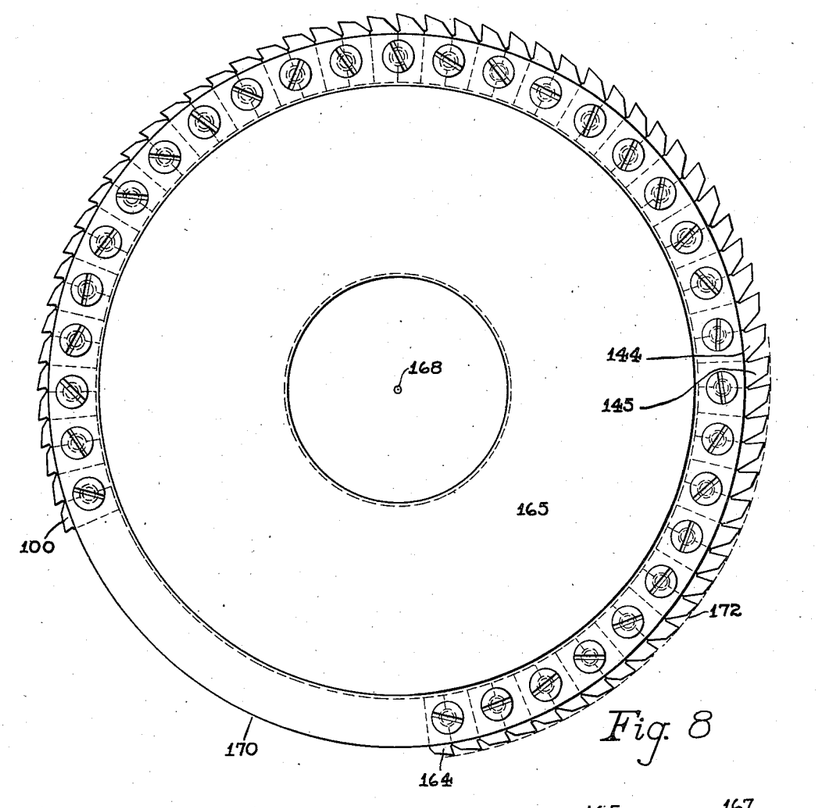
Fig. 8 is an elevation and Fig. 9 a sectional view of a cutter for cutting bevel gears constructed according to one embodiment of the invention.

A disc cutter of relatively large diameter is employed as the cutting tool. This tool has a plurality of cutting blades or teeth arranged around its periphery with a gap between the last and the first blades, as shown in Fig. 8, to permit indexing of the blank when this gap is abreast of the blank without relative withdrawal of the cutter away from the blank. In the preferred embodiment, the cutter is provided with both roughing and finishing blades so that the blank may be finish-cut from the solid. The roughing blades then precede the finishing blades and there is a gap between the last finishing blade and the first roughing blade to permit indexing. The roughing blades may be of any suitable profile shape.

Preferably, the roughing cuts are taken with the cutter rotating about an axis that is relatively fixed and with the blank so positioned that a line drawn radial of the blank axis and passing through the center of the tooth space, which is to be roughed out, is perpendicular to the cutter axis. The roughing blades may be made of gradually increasing height so that they cut, as the cutter rotates on its axis, deeper and deeper into the tooth space of the blank to the full depth or approximately the full depth of the tooth space as a limit. The finishing blades may be all of the same height or of varying heights, as will be described hereinafter. The invention may be used in the cutting of either bevel or spur gears but will be described herein specifically with reference to the cutting of bevel gears.

Figure 2:
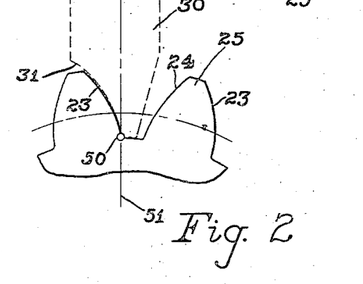
Fig. 2 is a diagrammatic view showing the cutter in operation of cutting at the large end of the gear tooth and showing the shape of the cutter blade which cuts at this end of the tooth.
Figure 3:
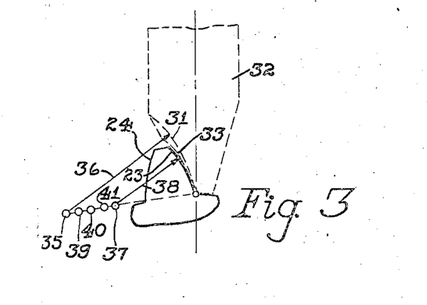
Fig. 3 is a diagrammatic view showing the cutter in operation at the small end of the gear tooth and showing the shape of the blade which cuts at this end of the tooth, as compared with the shape of the blade which cuts at the large end thereof.

20 denotes a bevel gear which is to be cut. 21 is the axis of this gear and 22 its cone apex. The opposite sides of the teeth of the gear are denoted at 23 and 24, respectively. The teeth of the gear are preferably cut so as to taper in width and in height from their large to their small ends, as is usual in bevel gearing. Fig. 2 is a view showing the large end of the teeth of the gear 20 and Fig. 3 shows the small end of a tooth.

For cutting this bevel gear, successive finishing blades of the cutter will vary in profile shape. Each is shaped according to the position at which it is to cut along the length of the gear tooth. Thus, for finishing the large end of the sides 23 of the gear teeth, a cutting blade 30 is provided that has a side cutting edge 31 curved to conform closely to the curvature desired on the tooth side 23 at the large end of the tooth. For cutting the tooth side 23 at the small end of the tooth, a cutting blade 32 is provided whose cutting edge 33 is curved to correspond approximately to the curvature desired on the side 23 of the tooth at the small end thereof.

Figure 4:
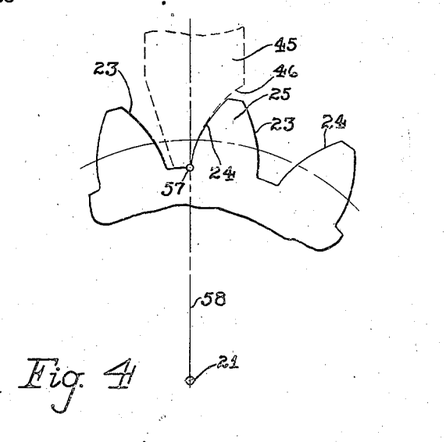
Fig. 4 is a view similar to Fig. 2, showing the cutting of the opposite side of the tooth space and showing the shape of the blade of the cutter which cuts this side at the large end thereof.

Likewise, the finishing blades of the cutter, which cut on the opposite sides 24 of the tooth spaces of the gear are curved, also, in accordance with the positions along the length of the gear tooth surface at which they are to cut. In Fig. 4 is shown the blade 45 whose cutting edge 46 cuts the tooth surfaces 24 at the large end thereof. Other blades, which cut the sides 24, will have cutting edges varying in shape similar to the variation in shape between the cutting edges 31—33 that cut on the sides 23. The tooth shapes produced upon the gear are the resultant of the profile shapes of the cutting blades and the relative feed movement of the cutter along the length of the gear teeth as will be clear hereinafter.

The cutting edges of the different finishing blades of the cutter are preferably curved along circular arcs. This is illustrated in Fig. 3, where the blade 32 is shown superimposed upon the blade 30. The cutting edge 31 of the blade 30 is curved along a circular arc whose center is at 35 and whose radius is denoted at 36, while the cutting edge 33 of the blade 32 is curved along a circular arc whose center is at 37 and whose radius is denoted at 38. Blades intermediate the blades 30 and 32, which cut at intermediate points along the length of the tooth side 23, have radii of curvature intermediate the radii of curvature of the cutting edges 31 and 33. Thus, in Fig. 3, 39, 40 and 41 denote centers of curvature of the cutting edges of blades of the cutter which are intermediate the blades 30 and 32.

Successive finishing blades are preferably so shaped that the centers of curvature of corresponding side cutting edges are preferably uniformly spaced from one another as shown in Fig. 3. The blades 45, etc., which cut the opposite sides 24 of the tooth spaces also have varying radii of curvature like the blades 30, 32, etc.

In the instance shown, the profiles of corresponding cutting edges have common tangents at the points 56 and 57 at or near the tips of the blades, that is, at or near the roots of the tooth surfaces to be cut. The profiles might be tangent, however, at any other points in the heights of the tooth surfaces.

For the finishing operation on the tooth side 23, the blank is turned on its axis from the above described roughing position, to a position such that a point 50 at or near the root of the profile 23 will lie in a plane 51 containing the blank axis and perpendicular to the cutter axis. Fig. 2 is a view along the root cone of the work, that is, a view such that the straight root cone element of the gear containing the point 50, as well as the apex 22 of the gear, is projected into the point 50.

In the finish-cutting operation, the cutter is fed relatively along the length of the gear tooth as it rotates in engagement with the blank. The feed movement may actually be imparted either to the cutter or to the work. The feed is timed with the rotation of the cutter and affected preferably at a uniform rate. During the feed movement, the differently curved cutting edges of the tool come into action and form profiles on the sides of the gear teeth which are increasingly curved from the large end to the small ends thereof.

Figure 1:
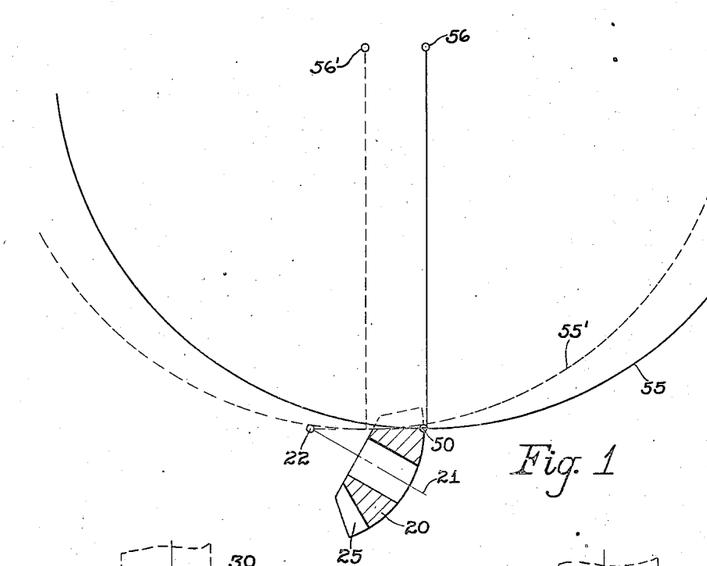
Fig. 1 is a diagrammatic view illustrating the lengthwise feed of a cutter along the tooth of a gear blank in cutting one member of a pair of bevel gears according to one embodiment of the invention.

In Fig. 1, two different positions of the cutter are indicated, at the opposite ends of the feed movement. In the position shown in full lines, the periphery of the cutter is denoted at 55 and its axis at 56. This is the position preferably occupied during the roughing of a tooth slot. The roughing operation may require a little less than one half of a turn of the large disc type cutter such as is here employed. At the end of the roughing operation, the work is rotated on its axis, as above stated to a position such as shown in Fig. 2. At the same time, one of three alternatives is followed, namely, (1) either the cutter is shifted axially to the position shown in Fig. 2, or (2) the work is moved bodily to the relative position shown, or (3) a gap is provided in the cutter between the roughing and the finishing blades and the finishing blades of the cutter are offset laterally with reference to the roughing blades so that their cutting edges will occupy the position shown in Fig. 2. If either of the first two named alternatives are employed, the motion used is timed with the turning motion of the blank on its axis. The set-over of cutter and blank is, then, in effect, a rolling movement in the direction of the cutter axis in which the cutter, constituting in effect a rack, rolls on a cylindrical pinion which is concentric with the work axis.

During the finishing of the side 23, the work or the cutter is fed in one direction along the root line 50—22 (Fig. 1) of the blank at a uniform rate until the tooth slot has been traversed for its whole length. In this operation, successive finishing blades of the cutter from the blade 30, which cuts at the large end, to the blade 32, which cuts at the small end and including these two blades, come successively into operation and finish-cut the side 23. At the end of the feed movement, the cutter will have assumed the position shown in dotted lines at 55' in Fig. 1 and its center will be at 56'.

The cutter continues to rotate on in the same direction but the feed motion is then reversed and simultaneously a set-over is effected so that the point 57 at or close to the bottom of the opposite side tooth surface 24 at the large end of the tooth will lie in the plane 58 containing the blank axis 21 and perpendicular to the cutter axis 56. The cutter or the blank is now fed in the opposite direction at a uniform rate until the cutter reaches again the relative position indicated by the full line 55. During this return feed motion, the successive blades of the cutter which are shaped to cut along the tooth sides 24 come successively into operation and produce the finished tooth surface 24 with its required change in profile shape from the small to the large end thereof.

Now the gap in the cutter comes abreast of the blank and the blank is indexed without relative withdrawal of the cutter from the blank. Upon the completion of the indexing operation, the cutter starts a new cycle, cutting into a new tooth space. Thus when the cutter has made as many revolutions as the blank has tooth spaces, the gear will be completed.

The feed motion is preferably effected through use of a cam which is geared at a one-to-one ratio to the cutter. The cam is formed with a long dwell for indexing and roughing and with uniform motion portions for the feed movement in opposite directions. Dwells may also be provided at the points of relative set-over of cutter and blank. The various portions of the cam may be joined by intermediate portions giving smooth action.

Both members of a pair of gears may be cut according to the method described with relation to Figs. 1 to 4 inclusive. If localization of tooth bearing is desired, the cutters used in cutting the two members of the pair will be made so that the lines of centers 35—37 (Fig. 3) of their cutting edges are differently inclined and will produce cone elements on gear and pinion which are offset from their apexes and inclined to one another, according to the principles disclosed in my prior patent above mentioned.

Figures 5, 6, 7:
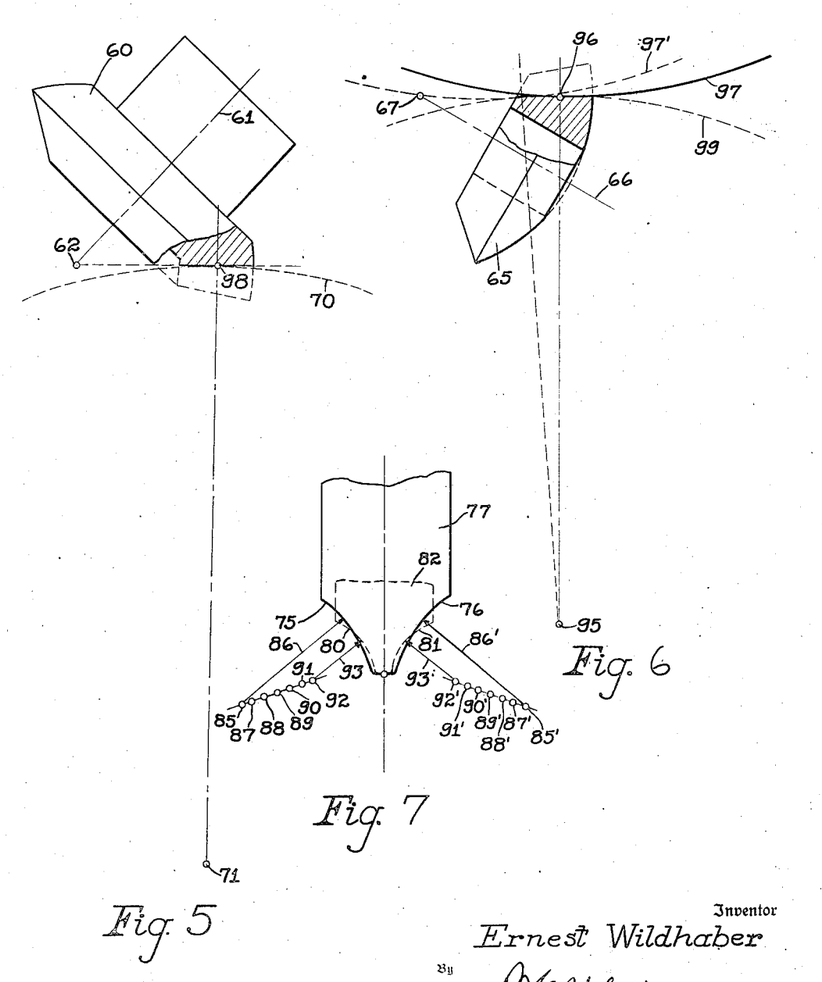
Figs. 5 and 6 are diagrammatic views illustrating the cutting of a bevel gear and pinion according to another modification of the invention.
Fig. 7 is a diagrammatic view showing the shape of different blades of the cutter which is employed in the cutting of the pinion according to this second embodiment.

One method for cutting gear pairs in which both members may have two sides of their teeth cut simultaneously is illustrated in Figs. 5 to 7 inclusive. Such a process gives, of course, a still higher rate of production than the single-side process described. In these figures, 60 denotes the gear or larger member of the pair and 65 the pinion or smaller member of the pair. The gear axis is designated at 61 and its apex at 62, while the pinion axis is denoted at 66 and its apex at 67.

The gear is cut with a large disc cutter having a plurality of roughing blades followed by a plurality of finishing blades arranged part-way around its periphery with a gap between the last finishing blade and the first roughing blade, but during the cutting operation the gear is cut in a single position of the cutter, that is, there is no relative feed of the cutter along the gear tooth in the cutting of the gear. Each of the finishing blades of the gear cutter may have opposite side cutting edges or alternate blades may be sharpened to cut on opposite sides of a tooth slot. The dotted line 70 denotes the periphery of the gear cutter and passes through the outermost points of the finishing blades of this cutter. The axis of the cutter is denoted at 71. During the cutting of a tooth slot of the gear, the cutter simply rotates on its axis 71 in engagement with the stationary gear blank. When the gap in the cutter comes abreast of the blank, the tooth slot will have been finished and the blank will be indexed. Corresponding side cutting edges of the finishing blades have identical concave cutting profiles.

With the described method of cutting the gear, tooth slots will be cut in the gear which have concavely curved bottoms.

The pinion 65 also has the two sides of its tooth spaces finish-cut simultaneously. The cutter employed, like the cutter for cutting the gear, may have finish-cutting blades which cut on both sides of the finished tooth slot simultaneously, or alternate blades may cut on opposite sides of the tooth slot. There are a plurality of roughing blades followed by a plurality of finishing blades and a gap between the last finishing blade and the first roughing blade to permit indexing. The side cutting edges of successive finish-cutting blades of the pinion cutter vary in shape. This is illustrated in Fig. 7. 75 and 76 indicate the opposite side-cutting edges of the blade 77 which is adapted to cut at the large end of the pinion tooth slots and 80 and 81 denote the cutting profiles of the blade 82 which is adapted to cut at the small end of the tooth spaces of the pinion. Blades intermediate the blades 77 and 82 have side-cutting edges whose profile curvature varies between the profile curvature of these blades.

The profiles of the pinion cutter blades are again preferably of circular arcuate curvature and of uniformly changing radius on successive blades. 85 and 85' denote the centers of curvature and 86 and 86' denote, respectively, the radii of the sides 75 and 76, respectively, of the blade 77. 92 and 92', respectively, are the centers of curvature of the sides 80 and 81 of the blade 82 while 93 and 93' denote, respectively, the radii of these cutting edges. Centers of curvature of blades intermediate the blades 77 and 82 are denoted at 87, 88, 89, 90, and 91 for one side of these blades and at 87', 88', 89', 90' and 91' for the other side of the blades. Successive blades are preferably so shaped that the centers of curvature of corresponding sides are uniformly spaced as shown.

The pinion is cut by rotating the cutter in engagement with the pinion blank while holding the pinion blank stationary on its axis and producing a relative feed movement between the cutter and blank about an axis 95 whose distance from the tooth space which is being cut is substantially equal to the distance of the center 71 from the tooth space that is being cut when the gear is being produced. A mean relative cutter position is indicated in full line at 97 in Fig. 6 and a position near the end of the finishing cut is shown in dotted lines at 97'.

The roughing cut on the pinion may be taken in a single position, as outlined before, or during a pass of the cutter along the length of the tooth in one direction. In the first instance, indexing of the pinion blank may take place during the return feed of the cutter about the axis 95 for one tooth space of the pinion will, then, be finish-cut during feed in one direction because both sides of the tooth space are cut simultaneously. In the second instance, indexing will take place at the end of the finishing feed movement.

The feed motion about the axis 95 may be performed by either the work or the cutter and again takes place preferably at a uniform rate. Localization of tooth bearing may be obtained by making the distance 95—96 or radius of swing of the pinion cutter slightly smaller than the distance 71—98 (Fig. 5), or outside radius of the gear cutter. The line of travel of the cutter during feed is denoted at 99 (Fig. 6). It will be noted that pinion tooth spaces are cut with convex bottoms and thus will mesh correctly with the teeth of the gear. During the feed movement, the different profiles of successive blades of the pinion cutter come into action and provide the required changing profile curvature of the tooth surfaces of the pinion from end to end of the pinion teeth. The tooth profiles of the pinion tooth surfaces have to change at a rate corresponding to the relative curvature of the gear pair, that is, of both the gear and pinion together, to make up for the constant profile of the gear teeth.

In a still further embodiment of the present invention, both gear and pinion may be cut two tooth sides simultaneously by rotating the cutter in engagement with the gear blank while holding the blank stationary on its axis and producing a rectilinear relative feed movement between the cutter and blank longitudinally of the tooth surfaces of the blank similar to that described above for the single-side cutting method.

When the feed movement of the cutter is along the root surface of a gear blank, the finishing blades of the cuter may be all of the same height, but when the feed movement is not along the root surface, but is inclined to it, the arrangement of the finishing blades has to be modified so that the blades cut the desired root surface. The tips of the blades are then arranged in a spiral and not in a circle. Such an arrangement may be helpful to avoid interference when a very large cutter is used. It is also to be understood that in some cases I may modify the root lines of the blanks if so desired.

The inclination of the lines 85—92 and 85'—92' of centers may be changed any desired amount if the direction of cutter feed is changed relatively to the blank so said lines may be made parallel to the cuter axis if desired.

Figure 9:
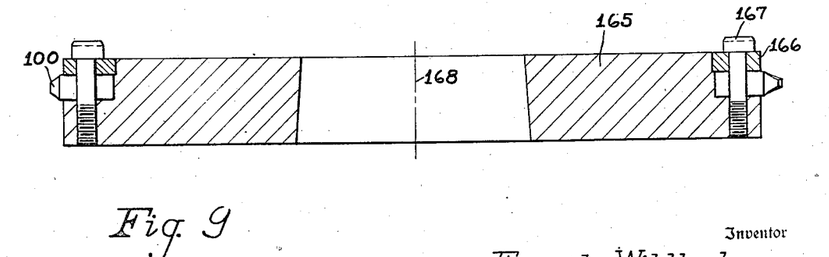

Figs. 8 and 9 show a cutter constructed according to one embodiment of this invention for successively roughing and finish-cutting simultaneously two sides of a tooth slot of a gear blank. The cutter has a plurality of roughing blades, the first of which is denoted at 100 and the last at 144 followed by a plurality of finishing blades, the first of which is denoted at 145 and the last at 164. The blades are arranged radially around the periphery of the cutter head 165 and are secured thereto in pairs by a clamping ring 166 and screws 167. The axis of the cutter is denoted at 168. The blades are arranged only part-way around the periphery of the cutter and there is a gap 170 between the last finishing blade 164 and the first roughing blade 100.

The roughing blades 100 to 144 inclusive graduate in height so as to cut successively deeper into a tooth slot of the blank as the cutter rotates in engagement with the blank. The finishing blades 145 to 164 inclusive also vary in height and have side-cutting profiles of uniformly varying curvature to cut at different points along the length of a gear tooth. In the embodiment shown, the tips of the finishing blades are arranged in a spiral 172. A cutter of this type is employed, as above described, when the feed of the cutter is along a line inclined to the root line of the blank.

A cutter such as shown may rotate on a relatively fixed axis during roughing and be fed relatively along the gear tooth only during finishing, in which event the blank will be indexed during the return feed movement when the gap 170 in the cutter is abreast of the blank. As an alternative, the cutter may be fed longitudinally of the tooth space in one direction during roughing and in the opposite direction during finishing and the blank may be indexed at the end of the return feed movement when the gap 170 is abreast of the blank.

Methods of relief-grinding the blades of cutters constructed according to this invention will now be outlined.

Figures 10, 11:
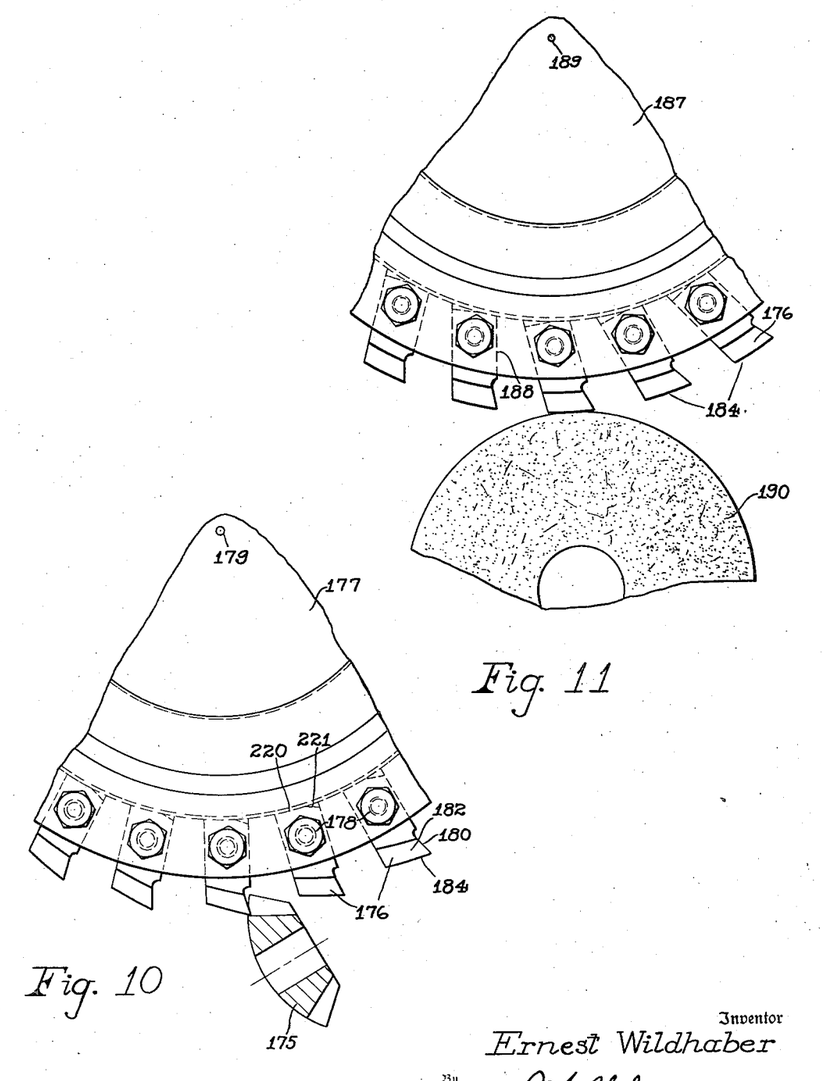
Fig. 10 is a fragmentary and somewhat diagrammatic view further illustrating the cutting of a bevel gear showing particularly how the finishing blades of a cutter are mounted in the cutter head.
Fig. 11 is a corresponding view showing how these blades are mounted in a dummy head in order to relief-grind the top surfaces thereof.

In Fig. 10, we have shown a fragment of a cutter in operative engagement with a bevel gear blank 175. Here the cutter is shown as having blades 176 that are secured in the cutter head 177 by individual bolts or screws 178. The blades 176 are mounted radially of the axis 179 of the head as are the blades of the cutter of Figs. 8 and 9 or of cutters constructed according to other embodiments of this invention. The blades are radially relieved back of their side cutting edges 180.

For grinding or cutting the relieved side surfaces 182 of the blades and the relieved top surfaces 184, the blades are mounted in dummy heads. In the method illustrated in Figs. 11 to 13 inclusive, one dummy head is provided for grinding the tops of the blades and two other dummy heads for grinding the opposite sides of the blades. A dummy head such as may be employed for grinding the tops of the blades is shown in Fig. 11. This head is provided with non-radial blade-receiving slots 188 so that when the blades are secured in the dummy head they are non-radial of the axis 189 of the dummy head and their relieved top surfaces 184 lie in a cylindrical surface coaxial of the axis 189 of the dummy head. In other words, when the blades are arranged in the dummy head, they are tilted out of their cutting position, the amount of tilt being equal to the relief angle which it is desired to grind upon the tops of the blades.

The relief-grinding of the top 184 of the blades is effected by engaging a cylindrical grinding wheel 190 with the tops of the blades and rotating the grinding wheel in engagement with the blades while rotating the dummy head 187 about its axis 189. Thus cylindrical relieved top surfaces are ground upon the blades.

Figure 12:
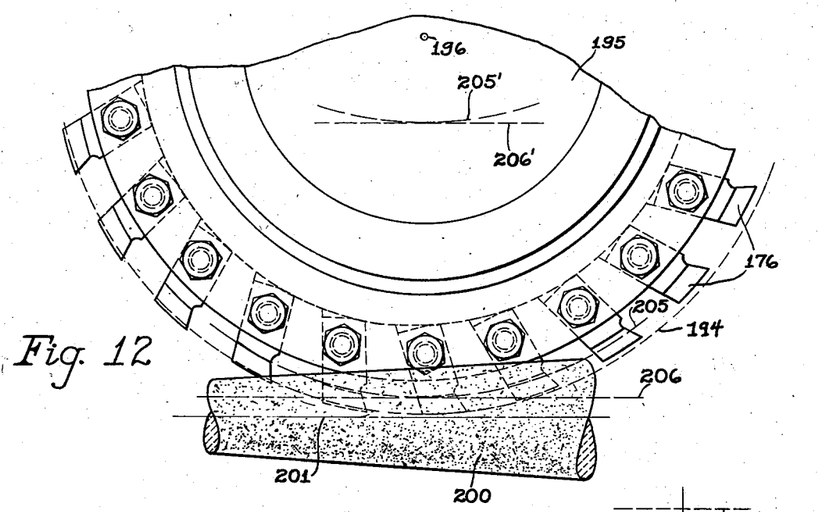
Figs. 12 and 13 are diagrammatic views, taken at right angles to one another, illustrating one method of relief-grinding the side surfaces of blades of a cutter made according to this invention.
Figure 13:
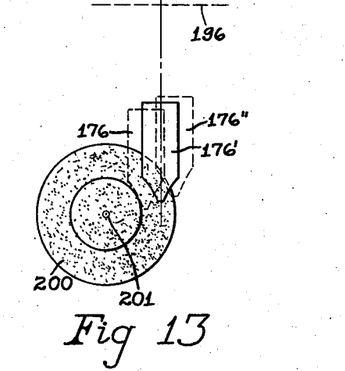

One of the dummy heads for the relief-grinding of the sides of the blades is illustrated in Figs. 12 and 13. This dummy head is denoted at 195 and the blades 176 to be ground are mounted not only non-radially in this head but they are also arranged so that the centers of curvature of the cutting edges at one side of the blades 176 coincide. In other words, the blades 176 are mounted in the dummy head 195 so that they are shifted axially and radially of the head from the positions which they occupy in the dummy head 187. This is shown in Fig. 13 where three blades, denoted respectively at 176, 176' and 176'' are superimposed upon one another. It will be noted that these blades are displaced from one another both axially and radially of the axis 196 of the dummy head 195. The blades are shifted in the direction of the lines 85—92 (Fig. 7), in effect, until their several profile centers coincide with the mean profile center 89. Thus the large blade 77 of Fig. 7 will be shifted in the dummy head in order to grind its side cutting edge 75 so that the profile center 85 of this side will coincide with the center 89 while the next blade whose center is at 87 will be shifted a distance 87—89 so that its profile center also coincides with the center 89, etc. The smallest blade 82 whose cutting edge 80 has its profile center at 92 will be shifted a distance 92—89. In Fig. 12 the dotted line 194 is a circular arc concentric with the axis 196 of the dummy head and indicates the radial displacement of successive blades in the dummy head.

For grinding the opposite side of the blades, a dummy head of analogous form would be employed which would permit positioning the blade so that the centers of the profiles of their opposite side cutting edges would coincide in a manner similar to that just described.

For the grinding of each side surface of the blades, a conical grinding wheel is used, such as shown at 200 in Figs. 12 and 13. This wheel is positioned in engagement with the blades so that its axis 201 lies in a plane perpendicular to the axis 196 of the dummy head. The relief-grinding operation is effected by feeding the rotating grinding wheel 200 along its axis 201 and simultaneously turning the dummy head 195 on its axis 196 in timed relation to said feed movement. The relative motion between the dummy head and the grinding wheel, aside from the rotation of the latter, is therefore of the character of a rolling motion. It may be such that a circle 205 concentric with the dummy head rolls on a line 206. The line 206 is in a plane perpendicular to the axis of the dummy head and in the embodiment being described parallel to the axis 201 of the grinding wheel. The rolling motion is therefore such as if a gear concentric with the dummy head would roll on a rack on which the grinding wheel is mounted. The grinding wheel, being conical, has, of course, a varying radius of curvature along its length so that as it is fed in the direction of its axis, it will grind side surfaces on successive blades which will have the required variation in profile curvature. The length of the grinding wheel may be reduced by providing a different ratio of roll between the grinding wheel and the dummy head such that, for instance, a smaller circle 205' concentric with the axis 196 of the dummy head rolls on a straight line 206'.

After grinding, when the blades are mounted radially in their own heads, they will have the necessary side-relief.

The method of relief-grinding just described is intended particularly for the relief-grinding of the finishing blades of a cutter and since the finishing blades occupy only a portion of the circumference of a cutter, two or more sets of finishing blades may be mounted in a dummy head to occupy the whole circumference of the dummy head and be ground simultaneously.

Figure 14:
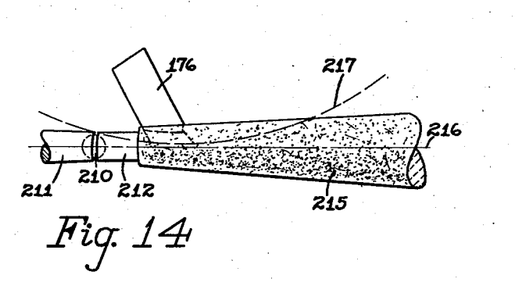
Figs. 14 and 15 are diagrammatic views, taken at right angles to one another, illustrating a modified method of relief grinding the blades of a cutter.

The grinding wheel is supported at its large end in the usual manner and may also be supported at its small end, as illustrated diagrammatically in Fig. 14, by a ball 210 which rests in a fixed center 211 and in a projection 212 of the steel core of the grinding wheel.

Figure 15:
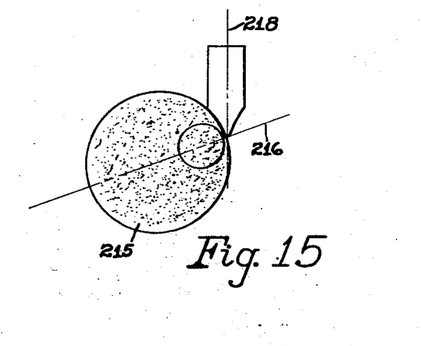

The method of relief-grinding the sides of the blades just described may be practiced upon a very simple machine since the grinding wheel is fed along its axis 201. It requires, however, three dummy heads. Another method of relief-grinding the blades of a cutter is illustrated in Figs. 14 and 15 which requires but one dummy head for grinding the top and the two side surfaces of the blades. Handling is therefore much simplified.

In this latter method, a conical grinding wheel is employed, as before. It is denoted at 215 and its axis is indicated at 216. The blades 176 which are to be ground, are mounted as before non-radially in the dummy head with their top surfaces lying in a cylindrical surface 217 that is coaxial of the axis of the dummy head. The blades are all so mounted in this dummy head that their median lines 218 all lie in the same plane perpendicular to the axis of the dummy head.

The conical grinding wheel 215 is so positioned that its axis 216 projects into the line of centers 85—92 or 85'—92' (Fig. 7) of the profiles of the side-cutting edges which are to be ground. In the grinding operation, the dummy head and the grinding wheel are rotated on their respective axes and simultaneously a feed movement is effected between the dummy head and the grinding wheel in a direction perpendicular to the axis of the dummy head, that is, perpendicular to the drawing plane of Fig. 15, which is the same as the drawing plane of Fig. 13. The axis 216 of the grinding wheel is, therefore, inclined to the direction of feed. The inclination of the axis to the drawing plane of Fig. 7 or Fig. 15 depends on the ratio of roll employed, as will be readily understood.

In Figs. 10, 11 and 12 I have shown cutting blades whose body portions are provided with bottoms consisting of two surfaces 220 and 221 that are inclined to one another. When the blades are secured in their own heads for cutting, the portion 220 of the bottom surface rests against the bottom of the blade-receiving slot, while when the blades are mounted in a dummy head 187 or 195, portion 221 of the bottom surface rests against the bottom of the blade-receiving slot. The angle between the surfaces 220 and 221 is determined by the angle to which the blades are tilted out of cutting position in the dummy head. Various other constructions will readily suggest themselves.

As mentioned before, the principles here disclosed are also applicable to the production of spur gears and also of helical gears.

For spur gears the relative feed movement between the cutter and the blank is usually in the direction of the spur teeth, that is along the blank axis. Helical gears may be produced with a feed along the helical teeth, that is a relative helical motion about the blank axis at a lead equal to the lead of the helical teeth.

In all cases the process of this invention gives an excellent roughing operation and a fine finishing cut. The roughing cuts are long cuts most of which extend usually along the whole length of the teeth. Moreover, by employing a cutter which makes but a single revolution per tooth space, a moderate length of feed only is required, whereas hobs or milling cutters fed in a similar manner require an extra feed-length. The feed for a hob or milling cutter must start with the hob or milling cutter clearing the blank at one end of the tooth and continue until the tool clears the blank at the opposite end of the tooth. This extra feed for hobs or milling cutters increases very much with increasing tool diameters and makes the use of large tool diameters practically impossible.

It may also be pointed out in connection with the present process that in many cases, particularly on bevel gears where two sides of a tooth space are cut simultaneously during a relative feed motion, the finishing line extends obliquely across the tooth surface. The finishing line is understood to be the line along which a cutting edge finishes a tooth surface. The general direction of a finishing line is from the top of the tooth on the large end towards the tooth bottom on the small end. This long finishing contact, which extends through a large part of the face width of the gear makes for a smooth and accurate finishing cut. The inclined finishing line also exists on helical gears, where however it is oppositely inclined on the two sides.

Other embodiments of the invention will suggest themselves to those skilled in the art. In general, it may be said that while the invention has been described in connection with particular embodiments thereof, it is capable of various further modifications and uses and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary disc cutter for cutting tapered gears, said cutter having a plurality of cutting blades arranged radially around its periphery with a gap between the last and first blades which is of sufficient angular extent to permit of indexing a gear blank, when the gap is abreast of the blank, without relative withdrawal of the cutter from the blank, said blades having side-cutting edges of concave circular arcuate shape, corresponding side-cutting edges of successive blades having progressively varying radii of curvature.

2. A rotary disc cutter for cutting tapered gears, said cutter having a plurality of cutting blades arranged radially part-way around its periphery with a gap between the last and first blades to permit of indexing the blank, when the gap is abreast of the blank, without relative withdrawal of the cutter from the blank, said blades having side-cutting edges of circular arcuate shape, and being of progressively varying height, corresponding side-cutting edges of successive blades having progressively varying radii of curvature.

3. The method of cutting a gear which comprises employing a rotary disc cutter that has a plurality of cutting blades arranged radially part-way around its periphery with a gap between the last and first blades, and rotating said cutter in engagement with a gear blank while holding the blank stationary on its axis and while producing a relative feed movement between the cutter and blank longitudinally of the teeth of the blank in time with the cutter rotation so that different blades cut at different points along the length of a gear tooth space as the rotating cutter is fed across the face of the blank, and indexing the blank while the gap in the cutter is abreast of the blank.

4. The method of cutting a gear which comprises employing a rotary disc cutter that has a plurality of cutting blades arranged radially part-way around its periphery with a gap between the last and first blades, and rotating said cutter in engagement with a gear blank while producing a relative reciprocating feed movement between the cutter and blank longitudinally of the teeth of the blank in time with the cutter rotation so that the cutter makes one revolution during a complete reciprocating feed movement, and holding the blank stationary on its axis while the blades of the cutter are operating upon a tooth space of the blank, and indexing the blank when the gap in the cutter is abreast of the blank.

5. The method of cutting a gear which comprises employing a rotary disc cutter that has a plurality of cutting blades, which have concave side-cutting edges, arranged radially part-way around its periphery with a gap between the last and first blades, rotating said cutter in engagement with a gear blank and producing a relative reciprocatory feed movement between the cutter and blank longitudinally of the teeth of the blank in time with the cutter rotation so that the cutter makes one revolution during a complete reciprocatory feed movement, holding the blank stationary on its axis while the blades of the cutter are operating in a tooth space of the blank, and indexing the blank when the gap in the cutter is abreast of the blank.

6. A rotary disc cutter for cutting tapered gears, having a plurality of radially disposed cutting blades that have opposite side-cutting edges of curved profile which are symmetrically disposed with reference to a plane of rotation perpendicular to the axis of the cutter, corresponding side-cutting edges of successive blades being differently inclined to said plane.

7. A rotary disc gear cutter having a plurality of radially disposed cutting blades arranged around the greater portion of its periphery with a gap between the last and first blades, corresponding side cutting edges of different blades being of concave circular arcuate profile curvature but being differently inclined to a plane of rotation perpendicular to the axis of the cutter, and said gap being of sufficient angular extent to permit indexing a gear blank when the gap is abreast of the blank without relative withdrawal of the cutter from the blank.

8. A rotary disc gear cutting having a plurality of radially disposed cutting blades arranged around the greater portion of its periphery with a gap between the last and first blades, said blades being of progressively varying height and having their top cutting edges arranged on a spiral and having side cutting edges which are of varying concave profile curvature and which are differently inclined to a plane of rotation perpendicular to the axis of the cutter, and said gap being of sufficient angular extent to permit indexing a gear blank, when the gap is abreast of the blank, without relative withdrawal of the cutter from the blank.

9. A rotary disc cutter for cutting gears by continuous rotation of the cutter and intermittent indexing of the gear blank, said cutter having a plurality of roughing blades followed by a plurality of finishing blades arranged radially part-way around its periphery with a gap between the last finishing blade and the first roughing blade, both the roughing and the finishing blades having opposite side-cutting edges of concave profile shape, said roughing blades being of progressively increasing height and said finishing blades being of progressively decreasing height, said finishing blades having their opposite side cutting edges offset laterally with reference to corresponding side cutting edges of the roughing blades, and said gap being of sufficient angular extent to permit indexing a gear blank, when the gap is abreast of the blank, without relative withdrawal of the cutter from the blank.

10. The method of cutting a gear which comprises employing a rotary disc cutter that has a plurality of roughing blades followed by a plurality of finishing blades arranged radially part-way around its periphery with a gap between the last finishing blade and the first roughing blade, rotating said cutter in engagement with a gear blank, and producing a relative reciprocatory movement between the cutter and the blank across the face of the blank in time with the cutter rotation and in one direction while the roughing blades are cutting and in the opposite direction while the finishing blades are cutting, and indexing the blank, when the gap in the cutter is abreast of the blank.

11. The method of cutting a tapered gear which comprises employing a rotary disc cutter, which has a plurality of cutting blades arranged radially part-way around its periphery with a gap between the last and first blades, said blades having side cutting edges of progressively varying profile curvature, rotating said cutter in engagement with the gear blank while holding the blank stationary on its axis and producing a relative movement between the cutter and blank across the face of the blank in time with the cutter rotation so that successive blades of the cutter cut at progressively different points along the length of a tooth space from one end of the tooth space to the other in a revolution of the cutter, and indexing the blank when the gap in the cutter is abreast of the blank.

12. The method of cutting a pair of gears which comprises cutting each tooth space of one member of the pair by rotating a disc cutter, whose blades are of constant profile curvature, in engagement with a gear blank while holding the blank stationary on its axis and while maintaining the axis of the cutter in a relatively fixed position to cut a tooth space having a concave bottom, and cutting each tooth space of the other member of the pair with a rotary disc cutter which has a plurality of cutting blades of varying profile curvature arranged radially part-way around its periphery with a gap between the last and first blades, by rotating the latter cutter in engagement with a second gear blank whole holding the blank stationary on its axis and while swinging the latter cutter relative to the second blank in a circular arc in time with the cutter rotation so that different blades of the latter cutter cut at progressively different points along the length of a tooth space from one end thereof to the other during the swinging movement and the tooth space will be formed with a convex bottom, and indexing the second blank when the gap in the second cutter is abreast of the blank.

13. The method of cutting a tapered gear which comprises employing a rotary disc cutter having a plurality of cutting blades of progressively varying height arranged radially part-way around its periphery with a gap between the last and first blades, rotating said cutter in engagement with the gear blank while holding the blank stationary on its axis and while simultaneously producing a relative movement between the cutter and blank longitudinally of a tooth space and in a direction inclined to the root line of the blank in time with the cutter rotation so that during said relative movement, different blades of the cutter cut at different points along the length of the tooth space from one end thereof to the other, and indexing the blank when the gap in the cutter is abreast of the blank.

14. A rotary disc cutter for cutting tapered gears, said cutter having a plurality of radially arranged cutting blades, each of the blades having side-cutting edges of concave profile shape and successive blades having their corresponding side-cutting edges disposed at different angles to a plane of rotation perpendicular to the axis of the cutter.

15. A rotary disc cutter for cutting tapered gears having a plurality of radially arranged blades, each of the blades having side-cutting edges of concave profile shape, successive blades being of progressively varying height and having their corresponding side-cutting edges disposed at different angles to a plane of rotation perpendicular to the axis of the cutter.

16. A rotary disc cutter for cutting tapered gears, said cutter having a plurality of radially disposed blades, each of the blades having side-cutting edges of concave curved profile shape, successive blades having their corresponding side-cutting edges of progressively varying profile curvature.

17. A rotary disc cutter for cutting tapered gears, said cutter having a plurality of radially disposed blades, each of the blades having side-cutting edges of concave curved profile shape, successive blades being of progressively varying height and having their corresponding side-cutting edges of progressively varying profile curvature.

18. A rotary disc cutter for cutting gears, said cutter having a plurality of radially disposed rough-cutting blades followed circumferentially by a plurality of radially disposed finish-cutting blades, said blades having opposite side cutting edges which are symmetrically disposed with reference to a plane of rotation perpendicular to the axis of the cutter, both the roughing and finishing blades being of progressively varying height and the side cutting edges of the finishing blades being offset laterally with reference to the side cutting edges of the roughing blades and being of progressively varying profile curvature.

19. A rotary disc cutter for cutting gears, said cutter having a plurality of radially disposed rough-cutting blades followed circumferentially by a plurality of radially disposed finish-cutting blades, the roughing blades being of progressively increasing height and the finishing blades being of progressively decreasing height, said finishing blades having opposite side-cutting edges which are offset laterally with reference to the corresponding side-cutting edges of the roughing blades.

20. A rotary disc cutter for cutting gears having a plurality of radially disposed cutting blades, said blades having opposite side-cutting edges of concave circular arcuate curvature which are symmetrically disposed with reference to a plane of rotation perpendicular to the axis of the cutter, and successive blades having the centers of curvature of corresponding side-cutting edges displaced relative to one another radially of the cutter axis.

21. A rotary cutter for cutting gears having a plurality of radially disposed cutting blades whose opposite side cutting edges are of concave circular arcuate profile curvature and are disposed symmetrically with reference to a plane of rotation perpendicular to the axis of the cutter, the centers of curvature of corresponding side-cutting edges of successive blades being displaced relative to one another both laterally and radially of the cutter axis.

22. The method of cutting a tapered gear which comprises employing a rotary disc cutter having a plurality of radially disposed blades whose corresponding side-cutting edges are of progressively varying concave profile curvature, and rotating said cutter in engagement with a gear blank while holding the blank stationary on the axis and while producing a relative feed movement between the cutter and blank across the face of the blank in time with the cutter rotation and so coordinated to the cutter rotation that different blades of the cutter cut at different points from one end of the tooth space to the other during a revolution of the cutter, and indexing the blank periodically.

23. The method of cutting a tapered gear which comprises employing a rotary disc cutter having a plurality of radially disposed blades which are of progressively varying height and whose corresponding side-cutting edges are of progressively varying profile curvature, and rotating said cutter in engagement with a gear blank while holding the blank stationary on its axis and while producing a relative feed movement between the cutter and blank across the face of the blank in a direction inclined to the root line of the blank and in time with the cutter rotation and so coordinated to the cutter rotation that different blades of the cutter cut at different points from one end of the tooth space to the other during a revolution of the cutter, and indexing the blank periodically.

24. The method of cutting a gear which comprises employing a rotary disc cutter that has a plurality of radially arranged roughing blades followed circumferentially by a plurality of radially arranged finishing blades, and rotating said cutter in engagement with a gear blank while producing a relative feed movement between the cutter and blank across the face of the blank which is in one direction while the roughing blades are cutting and in the opposite direction while the finishing blades are cutting.

25. The method of cutting a tapered gear which comprises employing a rotary disc cutter which has a plurality of radially disposed cutting blades whose side-cutting edges are of concave curved profile shape and whose corresponding side-cutting edges are differently inclined to the axis of the cutter, rotating said cutter in engagement with a gear blank, while holding the blank stationary on its axis, and while simultaneously producing a relative feed movement between the cutter and blank across the face of the blank in time with the cutter rotation so that different blades of the cutter cut at progressively different points from one end of a tooth space to the other in a revolution of the cutter, and indexing the blank periodically.

26. A rotary disc gear cutter having a plurality of roughing blades followed by a plurality of finishing blades arranged radially part-way around its periphery, both the roughing and finishing blades having opposite side cutting edges which are of concavo profile shape and which are symmetrically disposed with reference to a plane of rotation perpendicular to the axis of the cutter, the opposite side cutting edges of the finishing blades being offset laterally with reference to corresponding side cutting edges of the roughing blades, the roughing blades having their tip cutting edges arranged in a spiral about the axis of the cutter, and the finishing blades having their tip cutting edges arranged concentrically to the axis of the cutter.

27. A rotary gear cutter having a plurality of radially arranged cutting blades which have opposite side cutting edges that are symmetrically disposed with reference to a plane of rotation perpendicular to the axis of the cutter, said side cutting edges being of concave circular arcuate profile shape, corresponding side cutting edges of successive blades having different radii of curvature.

28. A rotary disc gear cutter having a plurality of radially arranged cutting blades which have their tip cutting edges concentric of the axis of the cutter and have opposite side cutting edges that are symmetrically disposed with reference to a plane of rotation perpendicular to the axis of the cutter, said side cutting edges being of concave profile shape, and corresponding side cutting edges of successive blades having different profile curvatures.

29. A rotary disc gear cutter having a plurality of radially arranged cutting blades which have their tip cutting edges arranged in a spiral about the axis of the cutter and have opposite side cutting edges that are symmetrically disposed with reference to a plane of rotation perpendicular to the axis of the cutter, said side cutting edges being of concave profile shape, and corresponding side cutting edges of successive blades having progressively different profile curvatures.

30. A rotary disc gear cutter having a plurality of radially arranged cutting blades which have their tip cutting edges concentric of the axis of the cutter and which have opposite side cutting edges that are symmetrically disposed with reference to a plane of rotation perpendicular to the axis of the cutter, said side cutting edges being of concave circular arcuate profile shape, corresponding side cutting edges of successive blades having centers of curvature displaced from one another axially of the cutter.

31. A rotary disc gear cutter having a plurality of radially arranged cutting blades which have their tip cutting edges arranged in a spiral about the axis of the cutter and which have opposite side cutting edges that are symmetrically disposed with reference to a plane of rotation perpendicular to the axis of the cutter, said side cutting edges being of concave circular arcuate profile shape, corresponding side cutting edges of successive blades having centers of curvature progressively displaced from one another radially and axially of the cutter.

32. A rotary disc gear cutter having a plurality of roughing blades followed by a plurality of finishing blades arranged radially part way around its periphery, both the roughing and finishing blades having opposite side cutting edges which are of concave circular arcuate profile shape and which are symmetrically disposed with reference to a plane of rotation perpendicular to the axis of the cutter, the centers of profile curvature of successive blades being displaced from one another, opposite side cutting edges of the finishing blades being offset laterally with reference to corresponding side cutting edges of the roughing blades, the roughing blades having their tip cutting edges arranged on a spiral about the axis of the cutter, and the finishing blades having their tip cutting edges arranged concentric to the axis of the cutter.

33. The method of cutting a gear which comprises cutting each of its tooth spaces by rotating a disc gear cutter, which has a plurality of radially arranged cutting blades whose opposite side cutting edges are of concave profile curvature, in engagement with a gear blank while holding the blank stationary on its axis and while producing a relative reciprocatory feed movement between the cutter and blank longitudinally of the tooth space from one end of the tooth space to the other which is so timed to the cutter rotation that the cutter makes one revolution per reciprocatory feed movement, and periodically indexing the blank.

34. The method of cutting a gear which comprises cutting each of its tooth spaces by rotating a disc gear cutter, which has a plurality of radially arranged cutting blades whose opposite side cutting edges are of concave circular arcuate profile curvature, in engagement with a gear blank while holding the blank stationary on its axis, and while producing a relative reciprocatory feed movement between the cutter and blank longitudinally of the tooth space from one end of the tooth space to the other which is so timed to the cutter rotation that the cutter makes one revolution per reciprocatory feed movement, and periodically indexing the blank.

35. The method of cutting a gear which comprises employing a disc gear cutter, which has a plurality of radially arranged cutting blades whose opposite side cutting edges are of concave circular arcuate profile curvature and which has the centers of curvature of the corresponding side cutting edges of successive blades arranged at successively different positions radially and axially of the cutter, and rotating said cutter in engagement with a gear blank while holding the blank stationary on its axis and while producing a relative reciprocatory feed movement between the cutter and blank longitudinally of a tooth space of the blank from one end of the tooth space to the other in such timed relation to the cutter rotation that the cutter makes one revolution per reciprocatory feed movement, and periodically indexing the blank.

36. The method of cutting a gear which comprises employing a disc gear cutter, which has a plurality of radially arranged cutting blades whose opposite side cutting edges are of concave circular arcuate profile curvature and in which the corresponding side cutting edges of successive blades have different curvatures, and rotating said cutter in engagement with a gear blank while holding the blank stationary on its axis, and while producing a relative reciprocatory feed movement between the cutter and blank longitudinally of a tooth space of the blank from one end of the tooth space to the other in such timed relation to the cutter rotation that the cutter makes one revolution per reciprocatory feed movement, and periodically indexing the blank.

37. The method of cutting a gear which comprises employing a disc gear cutter, which has a plurality of radially arranged cutting blades whose tip cutting edges are arranged in a spiral about the axis of the cutter and whose opposite side cutting edges are of concave profile curvature, and rotating said cutter in engagement with a gear blank while holding the blank stationary on its axis and while producing a relative reciprocatory feed movement between the cutter and blank longitudinally of a tooth space of the blank in a direction inclined to the root line of the tooth space and in such timed relation to the cutter rotation that the cutter makes one revolution per reciprocatory feed movement, and periodically indexing the blank.

38. The method of cutting a gear which comprises employing a disc gear cutter, which has a plurality of radially arranged cutting blades whose tip cutting edges are arranged in a spiral about the axis of the cutter and whose opposite side cutting edges are of concave profile curvature and in which the corresponding side cutting edges of successive blades have different profile curvatures, and rotating said cutter in engagement with a gear blank while holding the blank stationary on its axis and while producing a relative reciprocatory feed movement between the cutter and blank longitudinally of a tooth space of the blank in a direction inclined to the root line of the tooth space and in such timed relation to the cutter rotation that the cutter makes one revolution per reciprocatory feed movement, and periodically indexing the blank.

39. The method of cutting a gear which comprises employing a disc gear cutter, which has a plurality of radially arranged cutting blades whose opposite side cutting edges are of concave circular arcuate profile curvature and which have their tip cutting edges arranged in a spiral about the axis of the cutter and in which the corresponding side cutting edges of successive blades have progressively different radii of curvature, and rotating said cutter in engagement with a gear blank while holding the blank stationary on its axis and while producing a relative reciprocatory feed movement between the cutter and blank longitudinally of a tooth space of the blank in a direction inclined to the root line of the tooth space and in such timed relation to the cutter rotation that the cutter makes one revolution per reciprocatory feed movement, and periodically indexing the blank.

40. The method of cutting the tooth surfaces of a gear which comprises employing a disc gear cutter, which has a plurality of radially arranged cutting blades whose opposite side cutting edges are of concave profile curvature and which have their tip cutting edges concentric to the axis of the cutter, and rotating said cutter in engagement with a gear blank while holding the blank stationary on its axis, and producing a relative feed movement between the cutter and blank longitudinally of a tooth space of the blank in a direction parallel to the root line of the tooth space while said blades are cutting, said feed movement being in such timed relation to the cutter rotation that different blades cut at different points along the length of the tooth space from one end of the tooth space to the other during revolution of the cutter, and periodically indexing the blank.

41. The method of cutting the tooth surface of a gear which comprises employing a disc gear cutter, which has a plurality of radially arranged cutting blades whose opposite side cutting edges are of concave profile curvature and which have their tip cutting edges concentric of the axis of the cutter and in which the corresponding side cutting edges of successive blades have different profile curvatures, and rotating said cutter in engagement with a gear blank while holding the blank stationary on its axis, and producing a relative reciprocatory feed movement between the cutter and blank longitudinally of a tooth space of the blank in a direction parallel to the root line of the blank while said blades are cutting, said feed movement being in such timed relation to the cutter rotation that different blades cut at different points along the length of the tooth space from one end to the other during a revolution of the cutter, and periodically indexing the blank.

42. The method of cutting the tooth surfaces of a gear which comprises employing a disc gear cutter, which has a plurality of radially arranged cutting blades whose opposite side cutting edges are of concave circular arcuate profile curvature and which have their tip cutting edges concentric of the axis of the cutter and in which the corresponding side cutting edges of successive blades have their centers of curvature arranged at different distances from the axis of the cutter, and rotating said cutter in engagement with a gear blank while holding the blank stationary on its axis, and producing a relative reciprocatory feed movement between the cutter and blank longitudinally of a tooth space of the blank in a direction parallel to the root line of the tooth space while said blades are cutting, said feed movement being in such timed relation to the cutter rotation that different blades cut at different points along the length of the tooth space from one end to the other during a revolution of the cutter, and periodically indexing the blank.

43. The method of cutting the tooth surfaces of a gear which comprises employing a disc gear cutter, which has a plurality of radially disposed cutting blades arranged part way around its periphery with a gap between the last and first blades, a group of said blades having their tip cutting edges concentric of the axis of the cutter, the opposite side cutting edges of the blades of said group being of concave profile curvature, and rotating said cutter in engagement with a gear blank while holding the blank stationary on its axis, and producing a relative reciprocatory feed movement between the cutter and blank longitudinally of a tooth space of the blank in a direction parallel to the root line of the tooth space while said group of blades are cutting in such timed relation to the cutter rotation that the different blades of said group cut at different points along the length of the tooth space from one end to the other during a revolution of the cutter, and indexing the blank when the gap in the cutter is abreast of the blank.

44. The method of cutting a gear which comprises employing a disc gear cutter that has a plurality of radially arranged blades for cutting one side of a tooth space of a gear blank followed by a plurality of radially arranged blades for cutting the opposite sides of the tooth space and which has gaps between the last blade of each group and the first blade of the other group, rotating said cutter in engagement with a gear blank, while producing a relative reciprocatory feed movement between the cutter and blank longitudinally of a tooth space of the blank in such timed relation to the cutter rotation that the cutter makes one revolution per reciprocatory feed movement, and holding the blank stationary on its axis while the blades are cutting, and rotating the blank relative to the cutter to set over the blank relative to the cutter when one gap in the cutter is abreast of the blank, and indexing the blank when the other gap in the cutter is abreast of the blank.

45. The method of cutting a gear which comprises employing a disc cutter that has a plurality of radially disposed roughing blades followed by a plurality of radially disposed finishing blades arranged part way around its axis with a gap between the last roughing blade and the first finishing blade, and rotating said cutter in engagement with a gear blank while holding the blank stationary on its axis, and holding the cutter against movement longitudinally of a tooth space while the roughing blades are cutting in the tooth space, and effecting a relative movement between the cutter and blank longitudinally of the tooth space while the finishing blades are cutting in the tooth space so that different finishing blades cut progressively at different points from one end of the tooth space to the other during said relative movement, and indexing the blank when the gap in the cutter is abreast of the blank.

46. The method of cutting a pair of gears which comprises cutting each member of the pair with a cutter that has a plurality of radially disposed cutting blades whose opposite side cutting edges are of circular arcuate profile curvature, successive blades having the centers of curvature of corresponding side cutting edges displaced from one another, by rotating said cutter in engagement with a gear blank while holding the blank stationary on its axis and while producing a relative feed movement between the cutter and blank longitudinally of a tooth space of the blank so that different blades of the cutter cut progressively at different points along the length of the tooth space, and indexing the blank periodically, the cutters employed for cutting the two members of the pair having, respectively, the centers of curvature of corresponding side cutting edges of successive blades differently displaced from one another.

47. The method of cutting a pair of gears which comprises cutting each member of the pair with a cutter that has a plurality of radially disposed cutting blades whose opposite side cutting edges are of circular arcuate profile curvature, successive blades having different radii of curvature and having the centers of curvature of their corresponding side cutting edges so displaced from one another as to lie on a line inclined to the axis of the cutter when projected into a common plane radial of said axis, and rotating the cutter in engagement with a gear blank while holding the blank stationary on its axis and while producing a relative feed movement between the cutter and blank longitudinally of a tooth space of the blank so that different blades of the cutter cut progressively at different points along the length of the tooth space from one end to the other during a revolution of the cutter, and indexing the blank periodically, the lines of the centers of curvature of the corresponding side cutting edges of the two cutters being differently inclined to the axes of the two cutters.

48. The method of producing a gear which comprises positioning a disc cutter, that has a plurality of radially disposed cutting blades whose corresponding side cutting edges are of concave profile shape, in engagement with a gear blank, and cutting each tooth space of the blank by rotating said cutter on its axis while holding the blank stationary on its axis and while producing a relative feed movement at a varying velocity between the cutter and blank longitudinally of the tooth space in time with the cutter rotation so that successive blades of the cutter cut at progressively different points from one end of the tooth space to the other during the relative feed movement, and indexing the blank periodically.

49. The method of producing a gear which comprises positioning a disc cutter, that has a plurality of radially disposed cutting blades whose successive corresponding side cutting edges are of concave profile shape but have different profile curvatures, in engagement with a gear blank, and cutting each tooth space of the blank by rotating said cutter on its axis while holding the blank stationary on its axis and while producing a relative feed movement at a uniform velocity between the cutter and blank longtiudinally of the tooth space in time with the cutter rotation so that successive blades of the cutter cut at progressively different points from one end of the tooth space to the other during the relative feed movement, and indexing the blank periodically.

50. The method of producing a gear which comprises positioning a disc cutter, that has a plurality of radially disposed cutting blades whose successive corresponding side cutting edges are of concave profile shape but have different profile curvatures, in engagement with a gear blank and cutting each tooth space of the blank by rotating said cutter on its axis while holding the blank stationary on its axis and while producing a relative feed movement at a varying velocity between the cutter and blank longitudinally of the tooth space in time with the cutter rotation so that successive blades of the cutter cut at progressively different points from one end of the tooth space to the other during the relative feed movement, and indexing the blank periodically.

51. The method of producing a gear which comprises positioning a disc cutter, that has a plurality of radially disposed cutting blades whose successive corresponding side cutting edges are of circular arcuate profile shape but have their centers of curvature displaced from one another radially and axially of the cutter, in engagement with a gear blank, and cutting each tooth space of the blank by rotating said cutter on its axis, while holding the blank stationary on its axis and while producing a relative feed movement at a uniform velocity between the cutter and blank longitudinally of the tooth space in time with the cutter rotation so that successive blades of the cutter cut at progressively different points from one end of the tooth space to the other during the relative feed movement, and indexing the blank periodically.

52. The method of producing a gear which comprises positioning a disc milling cutter, that has a plurality of radially disposed cutting blades whose successive corresponding side cutting edges are of circular arcuate profile shape but have their centers of curvature displaced from one another radially and axially of the cutter, in engagement with a gear blank, and cutting each tooth space of the blank by rotating said cutter on its axis while holding the blank stationary on its axis and while producing a relative feed movement at a varying velocity between the cutter and blank longitudinally of the tooth space in time with the cutter rotation so that successive blades of the cutter cut at progressively different points from one end of the tooth space to the other during the relative feed movement, and indexing the blank periodically.

53. A rotary disc cutter for cutting tapered gears, having a plurality of radially disposed cutting blades which have opposite side cutting edges that are of circular arcuate profile curvature and that are symmetrically disposed with reference to a plane of rotation perpendicular to the axis of the cutter, the centers of curvature of different blades being displaced relative to one another radially and axially of the cutter axis.

ERNEST WILDHABER.